US005406079A

United States Patent [19]

Kato

[11] Patent Number: 5,406,079

[45] Date of Patent: Apr. 11, 1995

[54] IONIZATION DEVICE FOR IONIZING LIQUID SAMPLE

[75] Inventor: Yoshiaki Kato, Mito, Japan

[73] Assignee: Hitachi, Ltd., Tokyo, Japan

[21] Appl. No.: 127,927

[22] Filed: Sep. 28, 1993

[30] Foreign Application Priority Data

Oct. 20, 1992 [JP] Japan ..................... 4-280371

[51] Int. Cl.$^{6}$ ..................... B01D 59/44

[52] U.S. Cl. ..................... 250/288; 250/281

[58] Field of Search ............... 250/288 R, 288 A, 281, 250/282; 73/864.81

[56] References Cited

U.S. PATENT DOCUMENTS

| | | | |
|---|---|---|---|
| 4,209,696 | 6/1980 | Fite | 250/281 |
| 4,607,163 | 8/1986 | Mizuno | 250/288 |
| 4,963,736 | 10/1990 | Douglas et al. | 250/292 |
| 4,977,785 | 12/1990 | Willoughby et al. | 250/288 |
| 5,096,615 | 3/1992 | Prescott et al. | 250/288 |
| 5,170,052 | 12/1992 | Kato | 250/288 |
| 5,285,064 | 2/1994 | Willoughby | 250/288 |
| 5,306,412 | 4/1994 | Whitehouse et al. | 250/288 |

OTHER PUBLICATIONS

Analytical Chemistry, vol. 60, No. 8, Apr. 15, 1988, pp. 775–780.

Analytical Chemistry, vol. 62, No. 13, Jul. 1, 1990, pp. 713A–725 A.

J Am Soc Mass Spectrom 1991, 2, pp. 497–505.

*Primary Examiner*—Jack I. Berman

*Assistant Examiner*—James Beyer

*Attorney, Agent, or Firm*—Kenyon & Kenyon

[57] ABSTRACT

An ionization device for ionizing a liquid sample may be disposed between a liquid chromatograph and an atmospheric pressure ionization mass spectrometer. A gas inspirator supplies a mixed nebulizing gas, and a nebulizer includes a nozzle for spouting an effluent from the liquid chromatograph so as to supply an ionized particle of the effluent to the atmospheric pressure ionization mass spectrometer. The inspirator has a taper passage therein which is formed to be gradually narrower from one side for taking in the nebulizing gas to the other side for taking out the mixed nebulizing gas. The taper construction is provided with a port for providing the auxiliary gas thereon in order to obtain a constant mixing ratio of the auxiliary gas to the nebulizing gas.

11 Claims, 3 Drawing Sheets

IONIZATION DEVICE FOR IONIZING LIQUID SAMPLE

BACKGROUND OF THE INVENTION

The present invention relates to an ionization device for ionizing a liquid sample, the ionization device disposed between a liquid chromatograph and an atmospheric pressure ionization mass spectrometer.

An ionization device for ionizing a liquid sample is generally disposed as an interface between the liquid chromatograph and the atmospheric pressure ionization mass spectrometer.

Such an arrangement of a liquid chromatograph and an atmospheric pressure ionization mass spectrometer having an ionization device disposed therebetween is disclosed in the following references.

1) Analytical Chemistry, Vol. 62, No. 13, Jul. 1, 1990, pp 713A–725A.

2) Analytical Chemistry, Vol. 60, No. 8, Apr. 15, 1988, pp 774–780.

3) J. Am. Soc. Mass Spectrom, Vol. 2, 1991, pp 497–505

4) U.S. Pat. No. 4,209,696

5) U.S. Pat. No. 4,977,785

6) U.S. Pat. No. 4,963,736

The ionization device includes a nebulizing nozzle to which a high voltage is applied nebulizes an effluent from a separation column of the liquid chromatograph by a nebulizing gas supplied into the nebulizing nozzle. The ionization device further ionizes the nebulized effluent by applying the high voltage so as to provide ionized particles of the effluent into the mass spectrometer.

When the high voltage applied to the nebulizing nozzle is higher than 3 kV, a Corona discharge is apt to be generated from the nozzle. Therefore, an auxiliary gas is mixed in the nebulizing gas in order to avoid the generation of the Corona discharge.

For example, a predetermined amount of the auxiliary gas such as halogen, oxygen or air which has a high electro-negativity is mixed in the nebulizing gas in order to prevent the solvent-vapor such as methanol or acetonitrile of the liquid chromatograph from Corona discharge.

Further, it has been proposed to mix several percent of $SF_6$ gas as the auxiliary gas in the nebulizing gas instead of the Oxygen.

The flow amount of the nebulizing gas is controlled according to the flow rate and composition of the effluent from the liquid chromatograph and the flow rate of the auxiliary gas is controlled according to a flow rate of the nebulizing gas. Such control of the flow rate of the nebulizing gas and the auxiliary gas is so delicate that it is very difficult to keep a certain constant ratio between the nebulizing gas and the auxiliary gas.

SUMMARY OF THE INVENTION

The present invention overcomes the above-mentioned problem of the prior technique.

The present invention provides an ionization device which surely keeps a constant mixing ratio of an auxiliary gas to a nebulizing gas, the auxiliary gas containing elements having a high electro-negativity such as halogen, oxygen etc..

In order to keep the mixing ratio constant, a gas inspirator having a taper passage therein is provided which gradually becomes smaller from an inlet of the nebulizing gas to an outlet, and has a port of the auxiliary gas thereon. The mixed gas of the nebulizing gas and the auxiliary gas spouted from the outlet of the mixing inspirator by an action of the nebulizing gas is fed to the effuluent from the separation column so as to nebulize the effuluent.

A position of the port for the auxiliary gas on the taper passage may be changed by a control means.

Furthermore, air or the gas containing other elements having a high electro-negativity for preventing electric discharge are used as the auxiliary gas.

Furthermore, the auxiliary gas may be a gas obtained by bubbling a solvent with the nebulizing gas, the solvent being dissolved by the elements having the high electro negativity therein.

DETAILED DESCRIPTION

Figure 1:
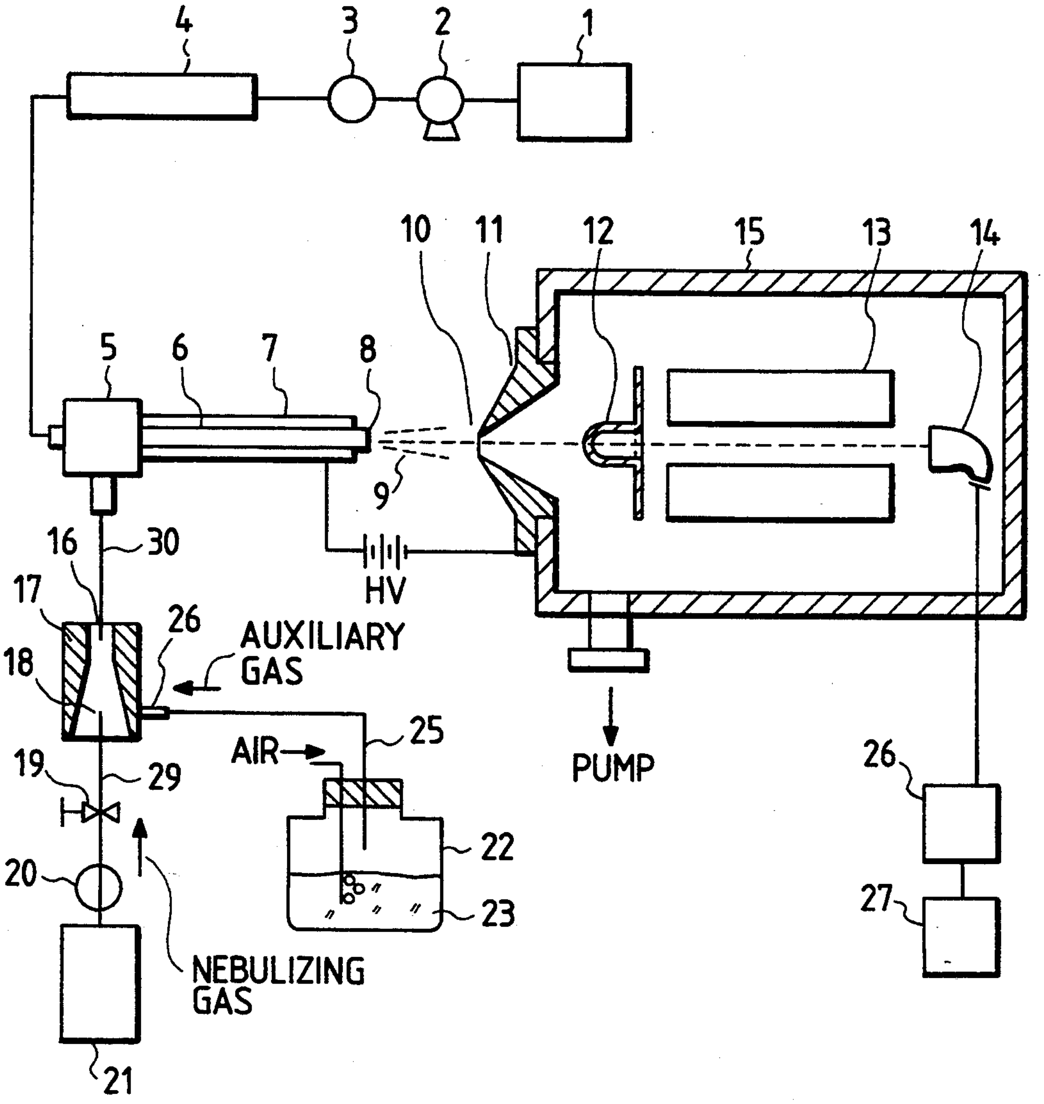
FIG. 1 is a schematic view illustrating an ionization device for ionizing a liquid sample, the ionization device disposed between a liquid chromatograph and a mass spectrometer apparatus according to an embodiment of the present invention.

One of the embodiments of an elevator apparatus applied in the present invention will be explained referring to FIG. 1.

An eluent is supplied from a storage bottle 1 by a pump 2 and a sample liquid is injected into the eluent at a sample injection port 3 so as to be separated by a separation column 4.

An effluent from the separation column 4 is sent to an inner tube 6 of a metal capillary through a connector 5 of a nebulizer. The nebulizer is constructed with two capillary tubes of the inner tube 6 and an outer tube 7, and a nebulizing gas is sent to a space between the inner tube 6 and the outer tube 7 so as to spout the effluent as particles from a tip of a nebulizing nozzle 8 into the air.

A high voltage HV is applied between the nebulizing nozzle 8 and an opposite electrode 11 so as to ionize the particles of the effluent, and the ionized particles are taken into a mass spectrometer being kept at a vacuum through an ion sampling apperture 10 provided on a top of a circular cone shaped electrode 11. The high voltage HV applied between the nebulizing nozzle 8 and the opposite electrode 11 is from 3 kV to 8 kV. When a negative voltage is applied to the opposite electrode 11, the nebulized particles are charged so as to generate positively charged particles. When a positive voltage is applied to the opposite electrode 11, the nebulized particles are charged so as to generate negatively charged particles.

The ionized particles taken into the mass spectrometer are accelerated by an accelerating electrode 12, and are selected according to the mass of the particles by a mass filter 13. The selected particles are detected by a detector 14 and a signal from the detector 14 is transmitted to a data recorder or data processing device 27 through a DC amplifier so as to provide mass spectra on the data recorder/the data processing device 27.

As stated above, the effluent from the separation column 4 of the liquid chromatograph is transmitted from the connector 5 of the nebulizer to the inner tube 6 and is spouted out in the air 9 by the nebulizing gas mixed with the auxiliary gas passing through the space between the inner tube and the outer tube.

The nebulizing gas is spouted out to a gas inspirator at a high speed through a pressure reducing valve 20, flow-rate adjusting valve 19 and a pipe 29.

Figure 2:
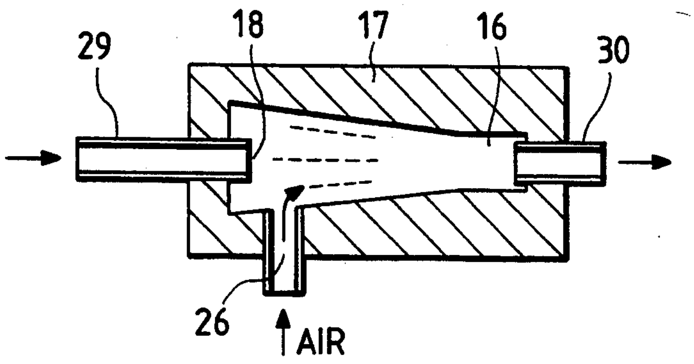
FIG. 2 is a schematic view showing an embodiment of the mixing inspirator according to the present invention.

As shown in FIG. 2, a taper passage is provided inside of the gas inspirator 17, which passage becomes gradually narrower from the pipe 29 to the pipe 30. Therefore, the nebulizing gas from the pipe 29 is accelerated by the taper passage so as to spout into the pipe 30 at a higher speed.

According to Bernoulli's Theorem, a negative pressure arises inside of the gas inspirator because of the acceleration of the nebulizing gas and the auxiliary gas is automatically inspired from an end port of a pipe 26 which is disposed on the taper passage.

An amount of the auxiliary gas inspired from the pipe 26 is proportional to a flow speed of the nebulizing gas, and therefore, a mixing ratio of the auxiliary gas to the nebulizing gas is constant.

Figure 3:
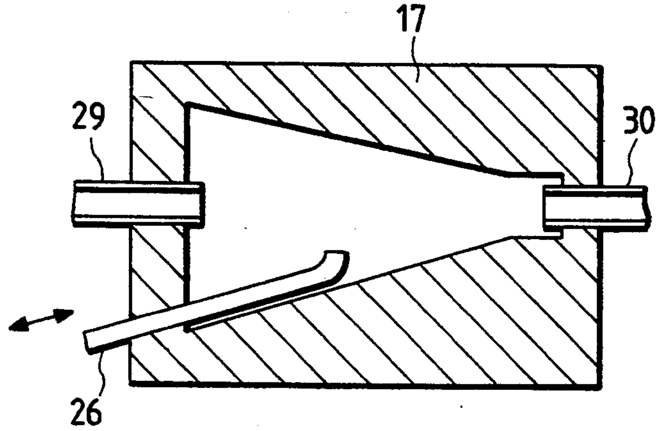
FIG. 3 is a schematic view showing another embodiment of the mixing inspirator according to the present invention.

When the mixing ratio should be changed, a spouting position of the pipe 26 on the taper passage may be changed by moving the pipe 26 in a slidable motion as shown in FIG. 3. When the spouting position of the pipe 26 is close to the pipe 30, the flow speed of the nebulizing gas becomes higher and when the spouting position of the pipe 26 is close to the pipe 29, the flow speed of the nebulizing gas becomes slower, and the mixing ratio of the auxiliary gas is changed according to a position of the port. Therefore, the mixing ratio of the auxiliary gas is kept at a constant value which is determined by the port position of the pipe 26.

In FIG. 1, a dried nitrogen gas is used as the nebulizing gas, for example, and the air containing a gas which has the high electron-negativity is used as the auxiliary gas. The negative pressure in the gas inspirator 17 is transmitted to a reagent bottle 22 through the pipes 26, 25. Evaporated solvent having a high electro-negativity is generated by bubbling the solvent in the reagent bottle with the air. The evaporated solvent is supplied to the gas inspirator.

As the mixing ratio of the auxiliary gas, that is, the air containing the evaporated solvent having the high electro-negativity, is kept constant, the discharge can be avoided by mixing the nebulizing gas from the gas inspirator with the effluent from the separation column 4.

Figure 4:
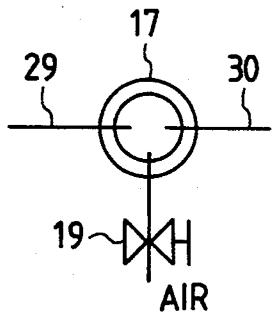
FIGS. 4 is a schematic view showing another embodiment of the mixing inspirator for inspiring an air according to the present invention.

As shown in FIG. 4, the pipe 26 may be opened to the air. The air contains oxygen gas having a high electronegativity and a mixed ratio of the air to the nebulizing gas is constant. The valve 19 is provided so as to open or close to the air and there is no function for controlling an inspiring amount of the air.

Figure 5:
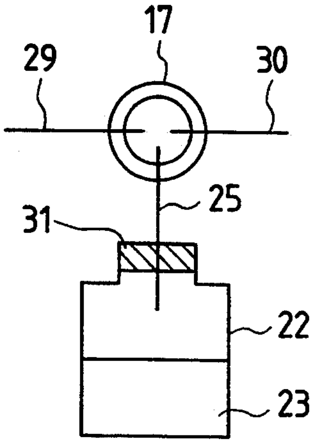
FIG. 5 is a schematic view showing another embodiment of the mixing inspirator for inspiring an auxiliary gas from a reagent bottle storing a solvent according to the present invention.

In FIG. 5, dichloromethylene ($CH_2CL_2$), chloroform ($CHCL_3$), carbontetrachloride ($CCL_4$) etc. are used for obtaining the auxiliary gas. A pipe 25 connected to a inspiring port of the gas inspirator 17 is fed into an upper portion in the reagent bottle 22. Liquid of the dichloromethylene ($CH_2CL_2$), chloroform ($CHCL_3$), carbontetrachloride ($CCL_4$) etc. is poured in the reagent bottle. They are evaporated at a room temperature and the upper portion of the reagent bottle is filled with the evaporated gas vapor. The vapor gas is inspired through the pipe 25 so as to be mixed with the nebulizing gas. After inspiring the vapor, the liquid sample is evaporated so as to fully supplement the inspired gas.

Figure 6:
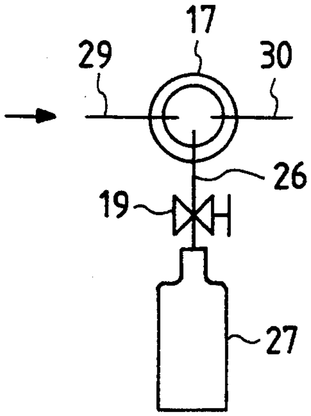
FIG. 6 is a schematic view showing another embodiment of the mixing inspirator for inspiring an auxiliary gas from a gas cylinder according to the present invention.

FIG. 6 shows another embodiment of the gas inspirator for inspiring the auxiliary gas of $SF_6$ by connecting the pipe to a gas cylinder 27.

The flow amount of the $SF_6$ gas is automatically controlled so as to keep a constant mixing ratio of the $SF_6$ gas to the nebulizing gas.

The valve 19 is provided so as to open or close to the air. There is no function for controlling an inspiring amount of the air in FIG. 6.

Figure 7:
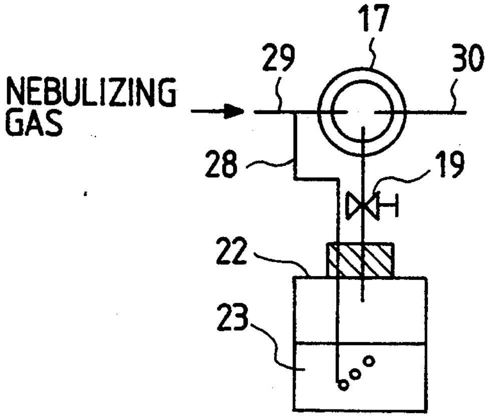
FIG. 7 is a schematic view showing an another embodiment of the mixing inspirator for inspiring an auxiliary gas from a reagent bottle storing a solvent by bubbling the solvent with the nebulizing gas in the present invention.

FIG. 7 shows another embodiment of the gas inspirator for inspiring the auxiliary gas by supplying the nebulizing gas instead of the air shown in FIG. 1. The nebulizing gas is supplied through a pipe 28 into the solvent 23 in the reagent bottle 22 and the auxiliary gas is supplied by bubbling the solvent 23 with the nebulizing gas so as to evaporate the solvent 23 having the electronegativity.

I claim:

1. An ionization device for ionizing a liquid sample, said ionization device disposed between a liquid chromatograph and an atmospheric pressure ionization mass spectrometer, the ionization device comprising:

a gas inspirator for supplying a mixed nebulizing gas by mixing a nebulizing gas with an auxiliary gas from a reagent bottle, which auxiliary gas contains elements having high electro-negativity so as to avoid Corona discharge; and a nebulizer having a nozzle to which a high voltage is applied for spouting an effluent from a separation column of the liquid chromatograph with the mixed nebulizing gas so as to supply an ionized particle of the effluent to the atmospheric pressure ionization mass spectrometer;

wherein said inspirator includes a taper passage which is formed to be narrower from one side for taking in the nebulizing gas to another side for taking out the mixed nebulizing gas, and wherein said taper passage is provided with a port for inspiring the auxiliary gas from the reagent bottle.

2. An ionization device as defined in claim 1, wherein said port is provided on the taper passage and is connected to the reagent bottle with a pipe.

3. An ionization device as defined in claim 2, wherein said pipe is guided into an upper portion of the reagent bottle containing a certain quantity of the reagent and said upper portion is provided with an evaporated gas in the reagent bottle as the auxiliary gas.

4. An ionization device as defined in claim 3, wherein said reagent bottle is bubbled with the nebulizing gas.

5. An ionization device as defined in claim 1, wherein said port is provided in the taper passage and forms an end of a pipe connected to the reagent bottle.

6. An ionization device as defined in claim 5, wherein said pipe is guided into an upper portion of the reagent bottle containing a certain quantity of the reagent and said upper portion is provided with an evaporated gas in the reagent bottle as the auxiliary gas.

7. An ionization device as defined in claim 1, wherein said inspirator includes a taper passage which is formed to be continuously narrower from the one side for taking in the nebulizing gas to the other side for taking out the mixed nebulizing gas.

8. An ionization device as defined in claim 7, wherein said continuously narrower passage comprises gradually sloping inner walls of said inspirator.

9. An ionization device for ionizing a liquid sample, said ionization device disposed between a liquid chromatograph and an atmospheric pressure ionization mass spectrometer, the ionization device comprising:

a gas inspirator for supplying a mixed nebulizing gas by mixing a nebulizing gas with auxiliary gas from a gas cylinder, which auxiliary gas contains elements having high electro-negativity so as to avoid Corona discharge; and a nebulizer having a nozzle to which a high voltage is applied for spouting an effluent from a separation column of the liquid chromatograph with the mixed nebulizing gas so as to supply an ionized particle of the effluent to the atmospheric pressure ionization mass spectrometer;

wherein said inspirator has a taper construction therein which is formed to be narrower from one side for taking in the nebulizing gas to the other side for taking out the mixed nebulizing gas, said taper passage provided with a port for inspiring the auxiliary gas from the cylinder.

10. An ionization device as defined in claim 9, wherein said inspirator includes a taper passage which is formed to be continuously narrower from the one side for taking in the nebulizing gas to the other side for taking out the mixed nebulizing gas.

11. An ionization device as defined in claim 10, wherein said continuously narrower passage comprises gradually sloping inner walls of said inspirator.

* * * * *